(12) United States Patent
Gregory et al.

(10) Patent No.: US 7,744,026 B2
(45) Date of Patent: Jun. 29, 2010

(54) FOOD MILL INCLUDING A REMOVABLE BLADE ASSEMBLY

(75) Inventors: Paul Gregory, Watertown, MA (US); Alexandre Hennen, Cambridge, MA (US); Conor McNamara, Brooklyn, NY (US)

(73) Assignee: Helen of Troy Limited, St. Michael (BB)

( * ) Notice: Subject to any disclaimer, the term of this patent is extended or adjusted under 35 U.S.C. 154(b) by 982 days.

(21) Appl. No.: 11/429,588

(22) Filed: May 5, 2006

(65) Prior Publication Data

US 2007/0257143 A1    Nov. 8, 2007

(51) Int. Cl.
*B02C 17/00* (2006.01)
*B07B 13/00* (2006.01)

(52) U.S. Cl. .................. 241/92; 241/169.1; 241/199.12

(58) Field of Classification Search ............ 241/199.12, 241/168, 169.1, 95, 92, 37.5
See application file for complete search history.

(56) References Cited

U.S. PATENT DOCUMENTS

| | | | |
|---|---|---|---|
| 244,604 A * | 7/1881 | Hoguet ................. | 241/199.12 |
| 677,732 A | 7/1901 | Blaney | |
| 856,295 A * | 6/1907 | Prindle ................. | 241/199.12 |
| 1,517,624 A * | 12/1924 | Girard et al. ............ | 241/285.2 |
| 2,200,035 A | 5/1940 | Mayer | |
| 2,520,075 A | 8/1950 | Williams | |
| 2,562,790 A | 7/1951 | Houston | |
| 2,570,126 A | 10/1951 | Hobbs | |
| 2,753,160 A | 7/1956 | Gunn | |
| 2,923,565 A | 2/1960 | Klebe | |
| 3,073,579 A | 1/1963 | Detrick | |
| 3,154,123 A * | 10/1964 | Tomlinson ............... | 241/101.6 |
| 3,187,366 A | 6/1965 | Fant | |
| 3,286,416 A | 11/1966 | Ashworth | |
| 3,313,332 A | 4/1967 | Stephan et al. | |
| 3,373,975 A | 3/1968 | Congdon | |
| 3,417,972 A | 12/1968 | Vincent | |
| 3,434,518 A | 3/1969 | Motis | |
| 3,761,026 A | 9/1973 | Rohmer | |
| 4,089,478 A | 5/1978 | Collie et al. | |
| 4,106,118 A | 8/1978 | Hoover | |
| 4,111,372 A | 9/1978 | Hicks et al. | |

(Continued)

FOREIGN PATENT DOCUMENTS

GB    667243    2/1952

(Continued)

OTHER PUBLICATIONS

Chef Depot, Product # CD4603-FOODMILL3BLADE-2QT, http://chefdepot.com/foodmill.htm.

(Continued)

*Primary Examiner*—Bena Miller
(74) *Attorney, Agent, or Firm*—Seyfarth Shaw LLP

(57) ABSTRACT

A food mill including a container having a first flange and an opposing second flange, and a blade assembly removably connected to the container. The blade assembly includes a support arm having a first end defining a slot engageable with the first flange, and a second end including a latch. The latch is movable between a first condition, where the latch is disengaged from the second flange, and a second condition, where the latch is engaged with the second flange.

16 Claims, 4 Drawing Sheets

U.S. PATENT DOCUMENTS

| | | | |
|---|---|---|---|
| 4,125,065 A | | 11/1978 | Lee |
| 4,190,371 A | | 2/1980 | Durr et al. |
| 4,505,408 A | | 3/1985 | Sagol |
| 4,588,136 A | | 5/1986 | Homma |
| 4,600,155 A | | 7/1986 | Bos et al. |
| 4,763,567 A | * | 8/1988 | Dalquist et al. ............ 99/323.5 |
| 4,840,119 A | | 6/1989 | Caldi |
| 4,863,278 A | | 9/1989 | Otto |
| 4,921,175 A | | 5/1990 | Okada et al. |
| 4,967,970 A | | 11/1990 | Michel |
| 5,007,591 A | | 4/1991 | Daniels, Jr. |
| 5,156,084 A | | 10/1992 | Lin |
| 5,163,357 A | | 11/1992 | Felknor et al. |
| D332,722 S | | 1/1993 | Torbet et al. |
| 5,221,055 A | | 6/1993 | Kuan |
| 5,327,695 A | | 7/1994 | Kelly |
| 5,383,613 A | | 1/1995 | Sundquist |
| 5,433,144 A | | 7/1995 | Lee |
| 5,735,193 A | | 4/1998 | Chang |
| 5,778,769 A | | 7/1998 | Dodson |
| 5,791,777 A | | 8/1998 | Mak |
| 5,934,581 A | | 8/1999 | Chiappa |
| 5,996,483 A | | 12/1999 | Yip |
| D421,545 S | | 3/2000 | Ekstrom |
| 6,042,034 A | | 3/2000 | Abledu |
| 6,049,947 A | | 4/2000 | Lu |
| 6,302,014 B1 | | 10/2001 | Kuan |
| 6,340,124 B1 | | 1/2002 | Charles et al. |
| 6,467,711 B2 | | 10/2002 | Michel |
| 6,550,372 B1 | | 4/2003 | Sharples |
| 6,585,179 B2 | | 7/2003 | Weibel et al. |
| D491,773 S | | 6/2004 | So |
| D493,665 S | | 8/2004 | Warning |
| 6,805,312 B2 | | 10/2004 | Capp |
| D501,628 S | | 2/2005 | Feil |
| 6,854,675 B2 | | 2/2005 | Wong |
| 6,863,430 B2 | | 3/2005 | Berube |
| 6,866,413 B2 | | 3/2005 | Donthnier et al. |
| D503,588 S | | 4/2005 | Feil |
| 6,932,503 B2 | | 8/2005 | Fallowes |
| 2004/0194633 A1 | | 10/2004 | Bourne |
| 2005/0039587 A1 | | 2/2005 | Gorun et al. |
| 2005/0056154 A1 | | 3/2005 | Fu |
| 2006/0033343 A1 | | 2/2006 | Xu |

FOREIGN PATENT DOCUMENTS

GB            679859           9/1952

OTHER PUBLICATIONS

RSVP Internatonal Rotary Food Mill, http://www.cooking.com/products/shprodde.asp?SKU=435420.

* cited by examiner

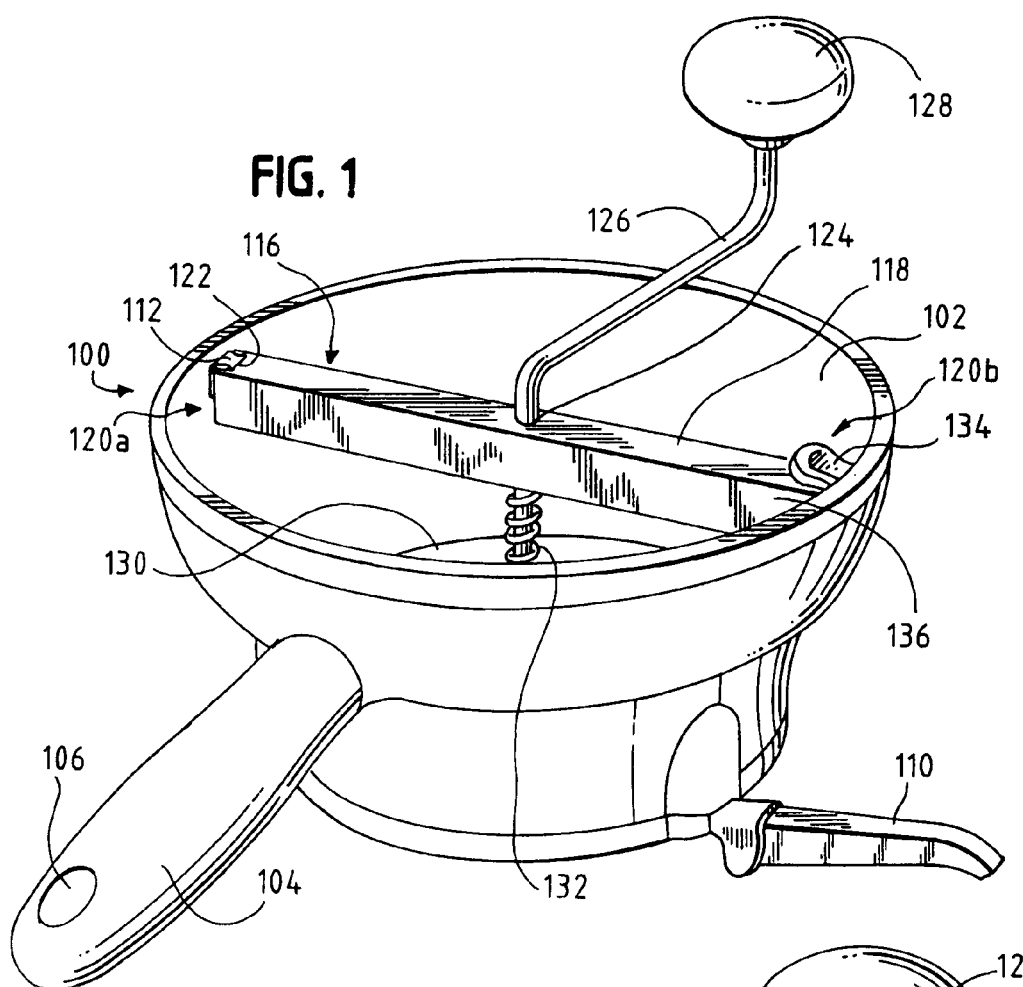
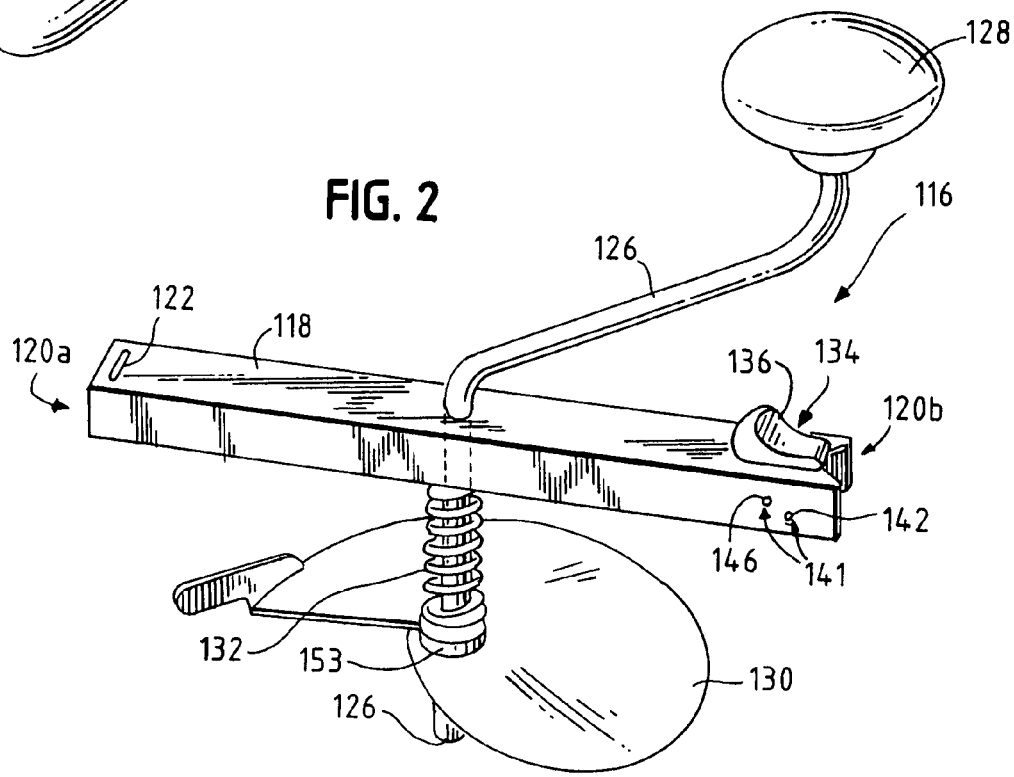

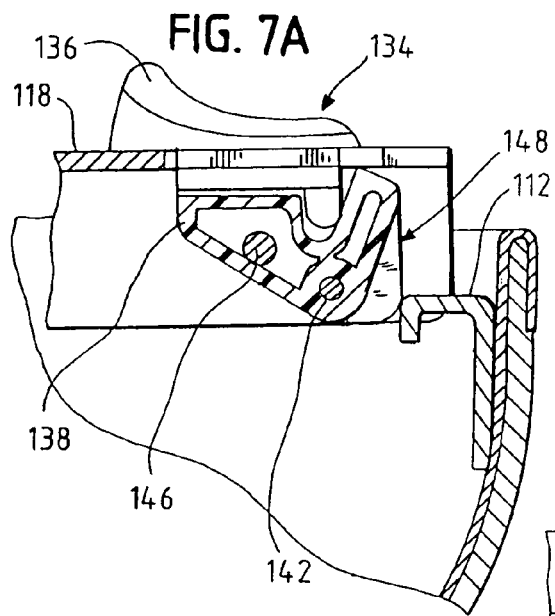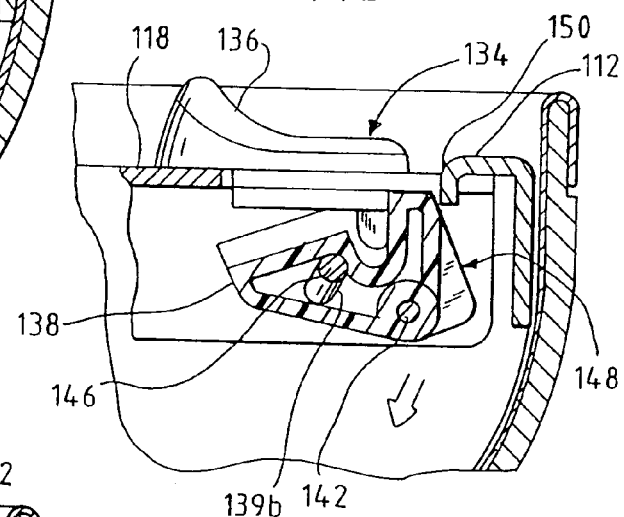

FOOD MILL INCLUDING A REMOVABLE BLADE ASSEMBLY

BACKGROUND

The present invention is directed to a food mill, and more specifically, to a food mill including a removable blade assembly.

Several kinds of different food processing equipment exist for preparing and cooking food items. One such food processor is a food mill which includes a container having one of a plurality of interchangeable blades which process one or more food items. Typically, food mills include a container having a handle and a blade which is positioned in the bottom of the container. The blade may have different sized openings. The food mill may include a plate which is biased toward the blade at the bottom of the food mill which may be connected to a handle that is rotatably connected to the food mill. A user rotates the handle which causes the plate to rotate and press against a food item placed in the food mill. The food item is pressed into and cut or sliced by the blade and the cut portion of the food item falls into a separate container, such as a bowl.

A blade assembly, and more specifically the handle, is held in position by a support bar which is connected to opposing sides of the food mill. Most conventional food mills have removable support arms which enable a user to remove the entire blade assembly for cleaning. It also allows the user to remove the blade assembly to place one or more food items in the container of the food mill. Typically, it is difficult to reinsert the blade assembly after one or more food items are placed in the food mill because the tension of the spring positioned between the plate and the support is high. Therefore a user has to struggle to reinsert the blade assembly and more specifically, position and connect the opposing ends of the support arms to the food mill.

Accordingly, there is a need for an improved food mill having a removable blade assembly that is easily removable and reinsertable into the food mill for food cleaning and food processing.

SUMMARY

One embodiment of the present invention provides a food mill including a container including a first flange and an opposing second flange and a blade assembly that is removably connected to the container. The blade assembly includes a support arm having a first end defining a slot engageable with the first flange, and a second end including a latch. The latch is movable between a first condition, where the latch is disengaged from the second flange, and a second condition, where the latch is engaged with the second flange.

In an embodiment, the latch includes a base that is movably connected to the support arm, a lever movably connected to the base and a bias member connected to the base. The bias member is adapted to bias the base towards the second flange, where when the latch is moved to the first condition, the base pivots to dis-engage from the second flange, and wherein when the latch is moved to the second condition, the base pivots to engage the second flange.

In an embodiment, the lever moves away from the second flange when the latch is moved to the first condition, and the lever moves toward the second flange when the latch is moved to the second condition.

In an embodiment, the latch includes a base movably connected to the support arm and a lever slidably connected to the base and the support arm. The lever is slidable in a slot defined by the second end of the support arm, where when the lever is slid away from the second end, the base pivots away from the second flange, and when the lever is slid toward the second end, the base pivots toward the second flange.

In an embodiment, the food mill includes a handle rotatably connected to the support arm. The handle includes a first end and a second end. The first end includes a knob and the second end includes a pressure plate and a bias member, where the bias member biases the pressure plate away from the support arm.

In an embodiment, the bias member is a spring positioned between the pressure plate and the support arm.

In an embodiment, the food mill includes an interchangeable cutting member seated in the container.

In an embodiment, the food mill includes a handle connected to the container.

In an embodiment, the food mill includes a pair of legs pivotably connected to the container, where each of the legs pivots between a first position adjacent to the container and a second position away from the container.

Another embodiment provides a blade assembly attachable to a food mill, where the food mill includes a first flange and an opposing second flange. The blade assembly includes a support arm having a first end and an opposing second end. The first end defines a first slot and the second end defines a second slot. The first slot is removably connected to the first flange, and the second slot is removably connected to the second flange. The blade assembly includes a latch that is movably connected to at least the first end of the support arm. The latch is movable between a first condition, where the latch is dis-engaged from the first flange, and a second condition, where the latch is engaged with the first flange to secure the blade assembly to the food mill.

In an embodiment, the latch includes a base, a lever movably connected to the base and a bias member connected to the base. The bias member is adapted to bias the base toward and away from the first flange, where when the latch is moved to the first condition, the base pivots away from the first flange, and when the latch is moved to the second condition, the base pivots toward the first flange.

In an embodiment, the lever is moved away from the first flange when the latch is moved to the first condition, and the lever is moved toward the second flange when the latch is moved to the second condition.

In an embodiment, the latch includes a lever movably connected to a base, where the lever is slidable in a slot defined by the second end of the support arm. When the lever is slid away from the second end, the base pivots away from the first flange, and when the lever is slid toward the second end, the base pivots toward the first flange.

In an embodiment, the blade assembly includes a handle rotatably connected to the support arm. The handle includes a first end and a second end. The first end includes a knob and the second end includes a pressure plate and a bias member, where the bias member biases the pressure plate away from the support arm.

In an embodiment, the bias member is a spring positioned between the pressure plate and the support arm.

Another advantage of the present invention is to provide a blade assembly for a food mill which can be removed using one hand.

Other objects, features and advantages of the invention will be apparent from the following detailed disclosure, taken in conjunction with the accompanying sheets of drawings, wherein like numerals refer to like parts, elements, components, steps and processes.

DESCRIPTION OF THE FIGURES

FIG. 1 is a perspective view of a food mill including a blade assembly of one embodiment of the present invention.

FIG. 2 is a perspective view of the blade assembly of FIG. 1.

FIG. 7A is a fragmentary sectional view of the latch of FIG. 5 illustrating the latch being pushed downward onto one of the flanges of the container.

FIG. 7B is a fragmentary sectional view of the latch of FIG. 5 illustrating the latch engaging the flange prior to the latch being secured to the flange.

FIG. 8A is a fragmentary sectional view of the latch of FIG. 5 in an engaged position.

FIG. 8B is a fragmentary sectional view of the latch of FIG. 5 in a non-engaged position.

DETAILED DESCRIPTION

Figure 3:
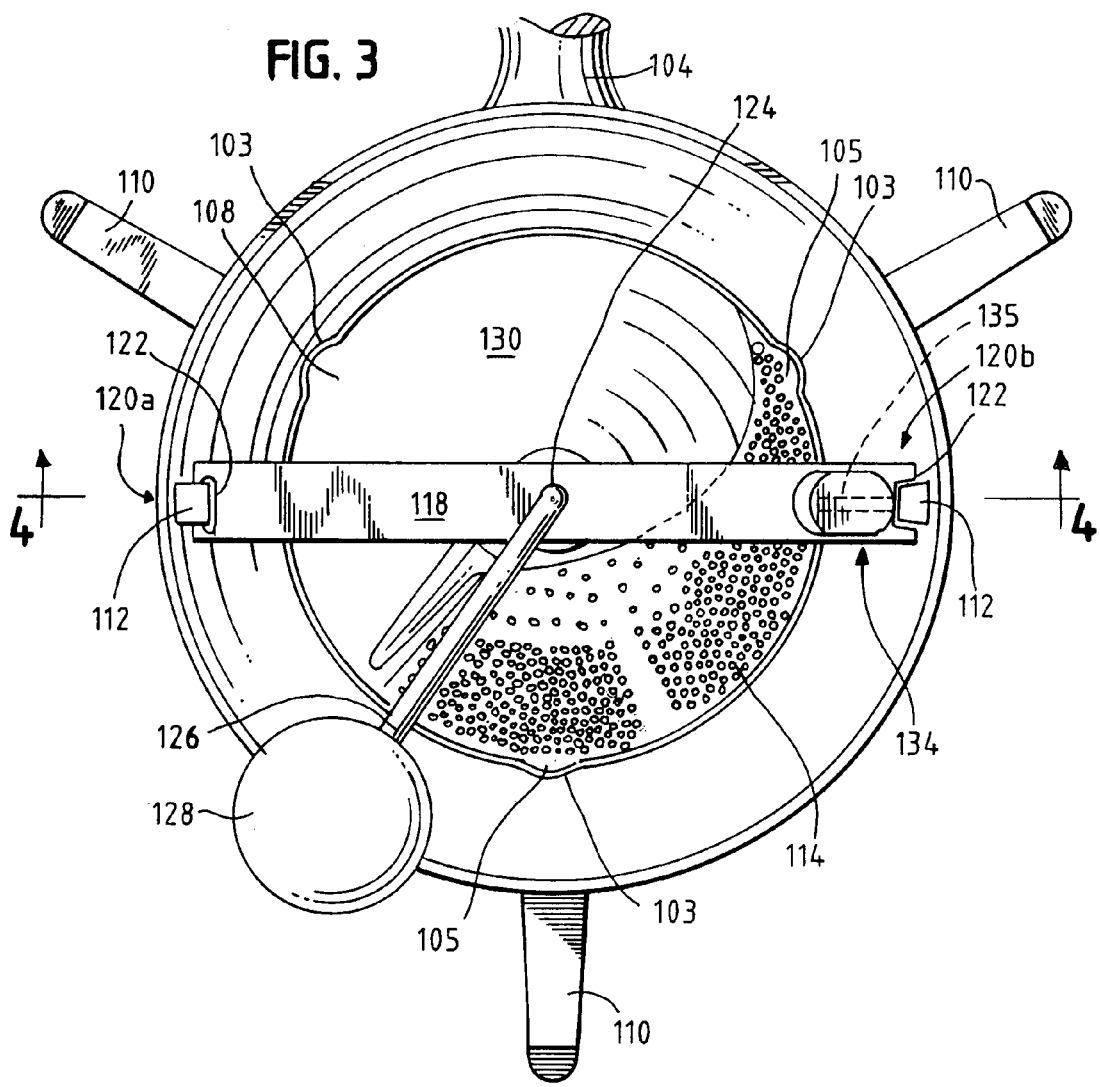
FIG. 3 is a top view of the food mill and blade assembly of FIG. 1.

The present invention is directed generally to a food mill and, more specifically, to a food mill including a removable blade assembly having a quick release latch which enables the blade assembly to be easily removable and re-insertable into the food mill.

Referring now to FIGS. 1-8B, an embodiment of a food mill 100 is illustrated, wherein the food mill includes a container 102, a cutting member 114 positioned in the container, and a blade assembly 116 which is removably connected to the container. In one embodiment, the container 102 is a generally circular container or bowl that resembles a pot or similar container. The container may be circular, square, rectangular or any suitable size and shape. A handle 104 is connected to the container 102 and enables a user to securely hold the container. As shown in FIG. 1, the handle extends substantially horizontally from the container. In an embodiment, the handle 104 defines at least one opening 106. The opening 106 is adapted to enable a user to hang and store the food mill 100 on a hook or other similar member for storage. The handle 104 has a generally oblong, elongated shape but may be any suitable size and shape. In an embodiment, the handle may be a separate component which is connected to the container 102. In another embodiment, the handle 104 may be integrally formed with the container 102.

In the illustrated embodiment, at least one, and preferably a plurality of legs 110 are pivotably connected to the container 102. Each leg 110 pivots between a first position adjacent to the container and a second position extending a designated distance away from the container. When fully extended, each of the legs 110 is substantially horizontal and engages a wall or lip of a separate underlying container such as a bowl (not shown). The legs 110 therefore provide support and stability to the food mill as it rests on the separate container or bowl during use. It should be appreciated that the legs 110 may be of any suitable size and shape. It should also be appreciated that one, two or more legs 110 may be connected to the container 102.

The bottom of the container 102 defines a generally circular opening (not shown) which is formed to receive a cutting member or blade 114. As best shown in FIG. 3, the bottom of the container 102 defines a plurality of recesses 103 which have a size and shape that corresponds to protrusions 105 defined by the blade 114. This enables the blade to be properly positioned and seated in the bottom of the container. A plurality of blades 114 may be designed to be seated in the bottom of the container 102 and may be interchangeable, depending on the food preparation needed. The blades, therefore, may include relatively small or relatively large holes or a combination of large and small holes.

In one embodiment, the container 102 includes a pair of opposing flanges 112. In an embodiment, the opposing flanges 112 are separate parts which are connected to the inside surface of the container 102. In another embodiment, the opposing flanges 112 are integrally formed with the inside surface of the container. Each of the flanges includes a substantially planar portion which is transverse to the inside surface of the container and a downwardly extending lip portion. It should be appreciated that the first and second flanges 112 may be of any suitable size or shape.

Figure 4:
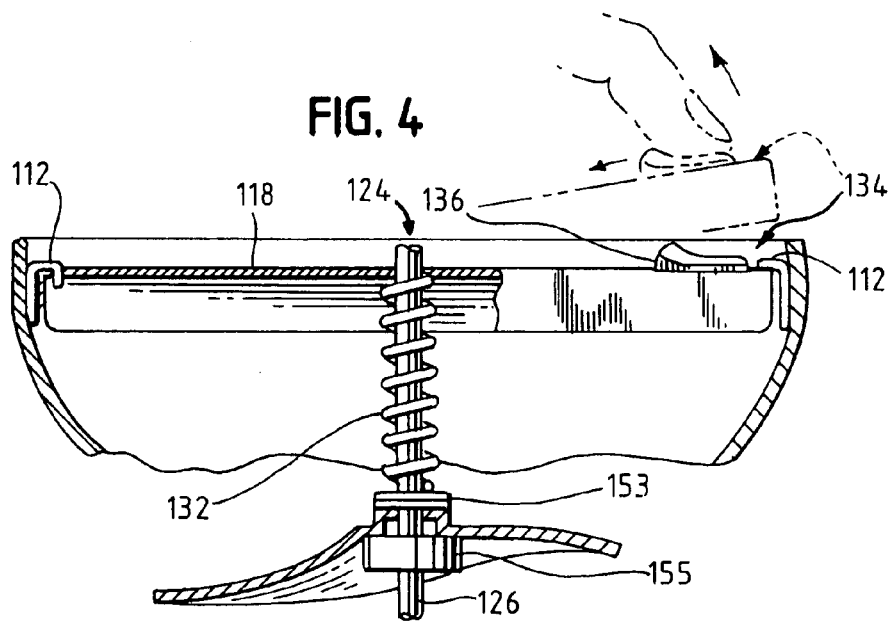
FIG. 4 is a fragmentary section view of the food mill and blade assembly of FIG. 1 taken substantially along the line 4-4 in FIG. 3.
Figure 5:
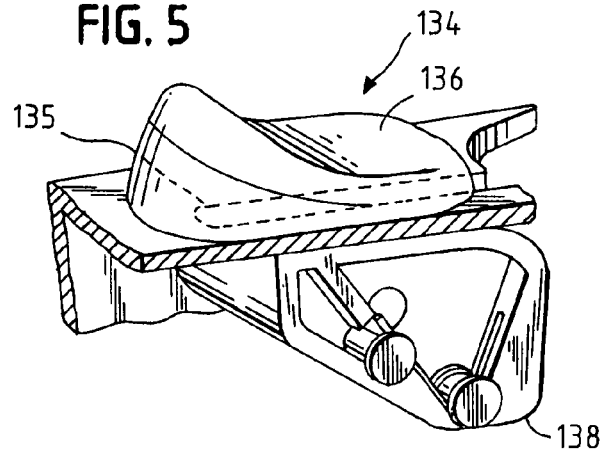
FIG. 5 is an enlarged, fragmentary perspective view of a latch of one embodiment of the present invention.
Figure 6:
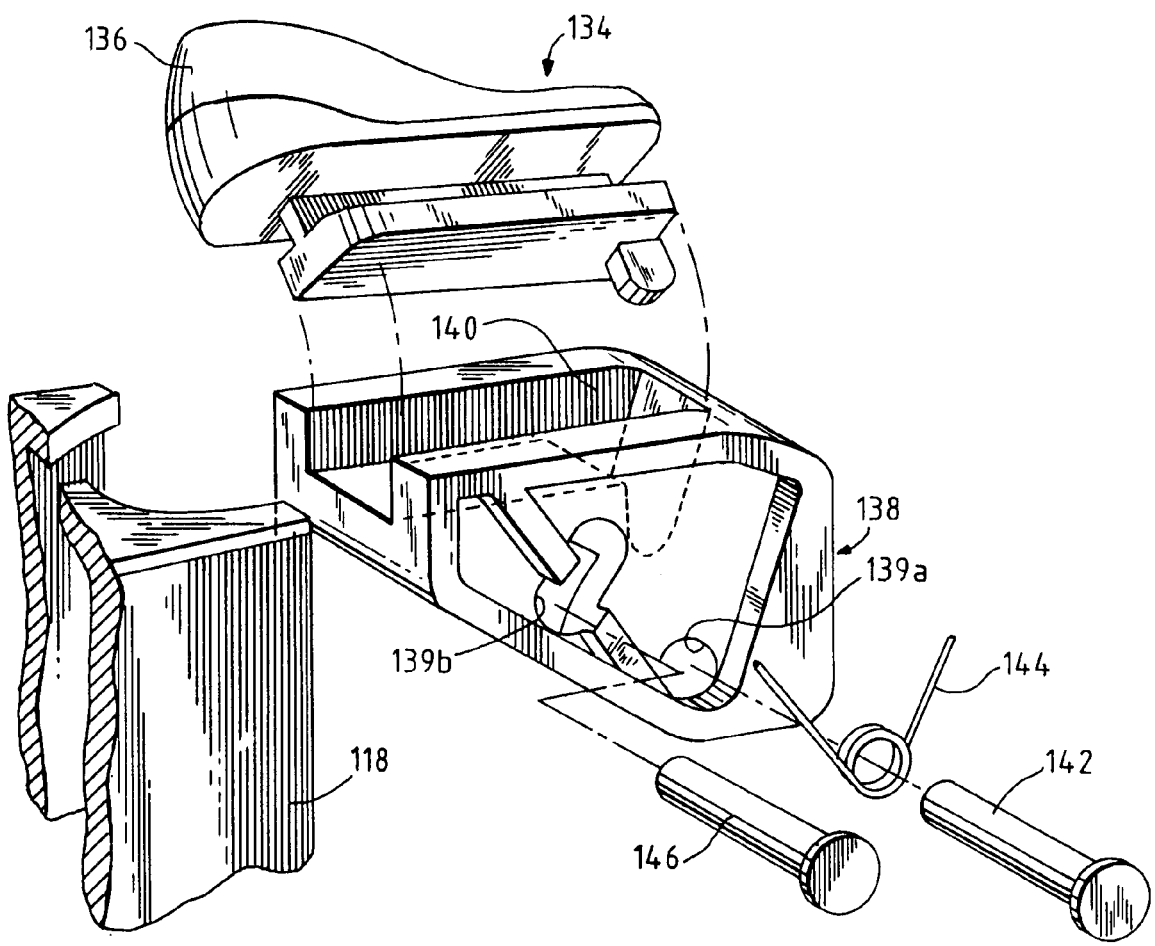
FIG. 6 is a further enlarged, fragmentary, exploded, perspective view of the latch of FIG. 5.

After one or more food items are placed in the container 102, the blade assembly or crank assembly 116 is positioned in the container 102 and secured in place by engaging the blade assembly with the first and second flanges 112. In an embodiment, the blade assembly 116 includes a cross bar or support arm 118 which is a substantially horizontal member having a first end 120a and an opposing second end 120b. The support arm 118 defines end slots 122 at each of the first and second ends 120a and 120b. Each of the end slots 122 is a generally oval, elongated opening. It should be appreciated that the end slots may be of any suitable size or shape. Each of the end slots 122 include a size and shape which corresponds to the size and shape of the flanges or tabs 112. As shown in FIGS. 3-4, the flanges 112 curve and form a lip portion 150 which extend respectively downwardly through the end slots 122. Additionally, the middle or center portion of the support arm 118 defines a center opening 124.

Referring to FIGS. 1, 2 and 4, a generally L-shaped arm 126 is rotatably connected to the opening 124 where one end of the arm 126 extends below the support arm 118 and the other end of the arm 126 is transverse to and extends generally outwardly away from the support arm 118. The end of arm 126 which extends below the support arm 118 towards the bottom of the container 102 is inserted through an opening defined by a rotatable member or rotatable plate 130 and into an opening defined in the center of the blade 114. The opening in the blade helps secure the arm 126 in place and minimize lateral movement of the blade assembly. In the illustrated embodiment, the plate 130 is secured to the arm 126 using stop washers 153 and 155. It should be appreciated that any suitable connector or fasteners may be used to secure the plate 130 in place.

The opposing end of the arm 126 includes a knob 128 which enables a user to manipulate and rotate the arm 126 with respect to the support arm 118. It should be appreciated that the knob 128 may be rotatably connected to the arm 126 to facilitate the rotation of the arm 126 with respect to the support arm 118. In an embodiment, the knob 128 defines a plurality of knurls or protrusions which enables a user to securely grab and hold the knob 128. The plate 130 has a size and shape (i.e., surface area) which is less than the size and shape of the blade 114. A bias member or spring 132 is positioned about the arm 126 between the plate 130 and the bottom of the support arm 118. In an embodiment, the spring 132 is a coil spring which biases the plate 130 downwardly toward the bottom of the container. The downward pressure of the plate 130 on one or more food items causes the food items to be pressed into the blade 114 as the plate 130 rotates. This causes the food item or items to be cut or sliced by the blade and processed by the food mill.

In the illustrated embodiment, a lever assembly or latch 134 is movably connected to at least one end of the support arm 118 in a slot 135. The latch 134 facilitates the easy removal and re-insertion of the support arm and thereby the blade assembly 116 with the container 102.

In one embodiment, a latch 134 is movably connected to a lever slot 135 defined by the support arm 118. The latch 134 includes a switch 136 having a generally T-shaped bottom portion which slidably engages a slot or channel 140 defined by the top of base 138. The base 138 defines a pair of openings 139a and 139b. After the latch is positioned in the support arm 118, openings 139a and 139b are aligned with corresponding openings 141 on the outside surfaces of the support arm 118. A pivot spring 144 having a generally V-shaped configuration is positioned so that pivot pin 142 is inserted through one side of the support arm 118 through the pivot spring 144 and the opening 139a defined by the base 138. The pivot pin 142 extends a predetermined distance from the opposing side of the support arm. A suitable connector may be connected to the opposing end of the pivot pin 142 to hold or secure it in place. In another embodiment, the pivot pin 142 is a rivet or similar connector which can be manipulated by the use of a tool to deform the pin and prevent the pin from being removed from the support arm.

In the illustrated embodiment, a stop pin 146 is inserted through the other opening defined by the side of the support arm and moves through a pivot slot 148 defined by the base 138. The opposing end of the stop pin 146 extends through a corresponding hole or opening defined on the opposite side of the support arm 118. A suitable connector is used to secure the stop pin 146 to the support arm so the stop pin does not fall out. Alternatively, as described above, the stop pin 146 could be a rivet or similar connector. The stop pin is connected so that it is able to move or slide within the slotted opening 139b. The stop pin 148 is positioned to support and provide resistance for a portion of the pivot spring 144. This causes the spring 144 to have a predetermined tension to cause the base 138 to pivot, as described in detail below.

Referring to FIGS. 1, 4, 7A, 7B, 8A and 8B, if a user wishes to remove the blade assembly 116 from the container 102, the user places one hand, and more particularly, a finger, such as their thumb, on the switch 136. The user then presses or pushes the switch 136 inwardly toward the center of the support arm 118. The inward movement of the switch 136 causes the base 138 to pivot from a first position, where engagement surface 148 is in contact with the lip portion 150 of the flange 112, to a second position, where the engagement surface 148 is not in contact with the lip portion 150 of flange 112.

As shown in FIG. 7A, 7B, 8A and 8B, the base 138 pivots about pivot pin 142 which causes the stop pin 146 to move from the lower position of slotted opening 139b to the top of the opening 139b. This movement of stop pin 146 presses one side of the pivot spring 144 inwardly to increase the tension on the spring. Thus the spring 144 biases the stop pin 146 toward the lower position in the pivot slot 148 shown in FIGS. 7A and 8A. The user may now tilt or pivot the support arm 118 downward to release and/or remove the end of the support arm from the container 102. After the end of the support arm 118 is released, the user releases the lever or switch 136, which causes the pivot spring 144 to bias the stop pin 146 to slide or move to the lower position of opening 139b which thereby causes the base 138 to pivot about pivot pin 142 back to its original position.

When the user wants to insert or re-insert the blade assembly 116 into the container 102, the user pivots the support arm 118 to engage the end slot 122 (on the side of the support arm opposite to the side including the latch assembly 134) with the lip portion 150 of one of the flanges 112. The user then pivots the opposing end of the support arm 118 downward toward the opposing flange 122 until the engagement surface 148 contacts the lip portion 150 of this flange as shown in FIG. 7A. The user continues to move or pivot the support arm 118 downwardly causing the engagement surface 148 to move along the outside surface of the lip portion 150, as shown in FIG. 7B, until the top of the engagement surface 148 is below the bottom of the lip portion. The base 138 then pivots back to its original position as shown in FIG. 8A where the engagement surface 148 is in contact with the lip portion 150 of the flange 112 to secure the support arm 118 in place.

Alternatively, the user can manipulate the lever 136 to connect the support arm 118 to the flange. The user grasps lever or switch 136 and moves or pushes it inwardly toward the center of the support arm 118 as shown in FIG. 8B. This causes the base 138 to pivot about pivot pin 142 and stop pin 146 to move to the upper or top position of opening 139b thereby compressing pivot spring 144. After the lip portion 150 of the flange 112 is inserted through the end slot 122 of the support arm, the user releases the switch 136 to enable the base 138 to move back to its original position. Specifically, the pivot spring 144 pushes against the stop pin 146 to cause the stop pin to move to the lower or bottom position of the slotted opening 139b as shown in FIG. 8A. This causes the base 138 to pivot with respect to the support arm 118 so that the engagement surface 148 of the base engages and/or contacts the lip portion 150 of flange 112 to securely hold the end of the support arm 118 in place in the food mill as described above.

The quick and easy one-handed or single-handed operation of the latch 134 to remove or release and re-insert the blade assembly 116 from the container reduces, if not eliminates, the difficulty users incur when removing and/or re-inserting conventional blade assemblies in a food mill. Thus, the latch of the present invention makes removal and/or re-insertion of the blade assembly in a food mill much more efficient and easier for users.

Although a slide type latch is employed with the support arm to remove and re-insert the blade assembly with the container of the food mill, it should be appreciated that any suitable latch or latch assembly may be employed to connect and reconnect the end of the support arm with the container. It should also be appreciated that each end of the support arm may include a latch or latch assembly to further enhance the removal and re-insertion of the blade assembly with the container of the food mill.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A food mill comprising:
   a container having an inner wall;
   a first flange and an opposing second flange disposed on the inner wall; and a blade assembly removably coupled to the container, the blade assembly including a support arm having a first end defining a slot engageable with the first flange, and a second end including a latch, the latch being movable between a first condition, wherein the latch is disengaged from the second flange, and a second condition, wherein the latch is engaged with the second flange;

wherein the support arm is configured to pivot about the first end when the slot is engaged with the first flange and the latch in the first condition is configured to permit the second end to pass below the second flange.

2. The food mill of claim 1, wherein the latch includes a base movably coupled to the support arm, a lever movably coupled to the base and a bias member connected to the base, the bias member adapted to bias the base towards the lever, wherein when the latch is moved to the first condition, the base pivots to disengage from the second flange, wherein when the latch is moved to the second condition, the base pivots to engage the second flange, wherein the lever moves away from the second flange when the latch is moved to the first condition, and wherein the lever moves toward the second flange when the latch is moved to the second condition.

3. The food mill of claim 1, which includes a handle rotatably connected to the support arm, the handle including a first end and a second end, the first end including a knob and the second end including a pressure plate and a bias member, wherein the bias member biases the pressure plate away from the support arm.

4. The food mill of claim 3, wherein the bias member is a spring positioned between the pressure plate and the support arm.

5. The food mill of claim 1, which includes an interchangeable cutting member seated in the container.

6. The food mill of claim 1, which includes a handle connected to the container.

7. The food mill of claim 1, which includes a pair of legs pivotably connected to the container, wherein each of the legs pivots between a first position adjacent to the container and a second position away from the container.

8. A food mill comprising:
a container having an inner wall;
a first flange and an opposing second flange disposed on the inner wall; and
a blade assembly removably connected to the container, the blade assembly including a support arm having a first end defining a slot engageable with the first flange, and a second end including a latch, the latch being movable between a first condition, wherein the latch is disengaged from the second flange, and a second condition, wherein the latch is engaged with the second flange;

wherein the latch in the first condition retracts a disengagement distance such that the support arm is configured to clear the second flange when pivoted about the first end, and the latch in the second condition extends to engage the second flange.

9. The food mill of claim 8, which includes a handle rotatably connected to the support arm, the handle including a first end and a second end, the first end including a knob and the second end including a pressure plate and a bias member, wherein the bias member biases the pressure plate away from the support arm.

10. The food mill of claim 9, wherein the bias member is a spring positioned between the pressure plate and the support arm.

11. The food mill of claim 8, which includes an interchangeable cutting member seated in the container.

12. The food mill of claim 8, which includes a handle connected to the container.

13. The food mill of claim 8, which includes a pair of legs pivotably connected to the container, wherein each of the legs pivots between a first position adjacent to the container and a second position away from the container.

14. A blade assembly attachable to a food mill, wherein the food mill has an inner wall and a first flange and an opposing second flange disposed on the inner wall, the blade assembly comprising:
a support arm having a first end and an opposing second end, the first end defining a first slot and the second end defining a second slot, the first slot being removably connected to the first flange, the second slot being removably connected to the second flange; and
a latch movably connected to at least the first end of the support arm, the latch being movable between a first condition, wherein the latch is dis-engaged from the first flange, and a second condition, wherein the latch is engaged with the first flange to secure the blade assembly to the food mill;
wherein the support arm further includes an engagement extension for engaging the first flange when the latch is in the second condition.

15. The blade assembly of claim 14, which includes a handle rotatably connected to the support arm, the handle including a first end and a second end, the first end including a knob and the second end including a pressure plate and a bias member, wherein the bias member biases the pressure plate away from the support arm.

16. The blade assembly of claim 15, wherein the bias member is a spring positioned between the pressure plate and the support arm.

* * * * *